United States Patent
Asai et al.

(10) Patent No.: US 10,965,872 B2
(45) Date of Patent: Mar. 30, 2021

(54) IMAGE DISPLAY APPARATUS

(71) Applicant: TOYOTA JIDOSHA KABUSHIKI KAISHA, Toyota (JP)

(72) Inventors: Goro Asai, Toyota (JP); Yuka Shidochi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/188,656

(22) Filed: Nov. 13, 2018

(65) Prior Publication Data

US 2019/0174065 A1    Jun. 6, 2019

(30) Foreign Application Priority Data

Dec. 5, 2017   (JP) ............................. JP2017-233733

(51) Int. Cl.
   *H04N 5/232*   (2006.01)
   *B60R 1/00*    (2006.01)
   *H04N 7/18*    (2006.01)

(52) U.S. Cl.
   CPC ........... *H04N 5/23293* (2013.01); *B60R 1/00* (2013.01); *B60R 1/007* (2013.01); *H04N 7/181* (2013.01);
   (Continued)

(58) Field of Classification Search
   CPC .. H04N 5/23293; H04N 7/181; H04N 13/243; H04N 13/194; H04N 13/156; H04N 13/395; H04N 7/18; B60R 1/00; B60R 1/007; B60R 2300/605; B60R 2300/105; B60R 2300/8046; B60R 2300/802; B60R 2300/303; B60R 16/037; G06T 1/0007; B60Q 1/00
   See application file for complete search history.

(56) References Cited

U.S. PATENT DOCUMENTS

2005/0128061 A1*  6/2005  Yanai ...................... H04N 7/181
                                                            340/435
2008/0231703 A1*  9/2008  Nagata ................... H04N 7/181
                                                            348/148
(Continued)

FOREIGN PATENT DOCUMENTS

CN           101396989 A        4/2009
DE      102010038825 A1 *      2/2011    ............. G08G 1/167
(Continued)

*Primary Examiner* — Dramos Kalapodas
(74) *Attorney, Agent, or Firm* — Sughrue Mion, PLLC

(57) ABSTRACT

An image display apparatus has: a setting device (132) for setting a synthesizing plane (CS) at a position that is away backward from a first vehicle; a synthesizing device (133) for synthesizing a rear image (111B) captured by a rear imaging device (11B) for imaging a rear area of the first vehicle and a rear side image (111BL, 111BR) captured by a rear side imaging device (11B) for imaging a rear side area of the first vehicle to generate a synthesized image (111C) in which a scene in the rear image and a scene in the rear side image are seamlessly connected at a position of the synthesizing plane, the setting device sets the synthesizing plane at a position that is different from a position at which the synthesizing plane is set when a second vehicle does not exist at the rear of the first vehicle, when the second vehicle exists at the rear of the first vehicle.

5 Claims, 12 Drawing Sheets

(52) U.S. Cl.
CPC ... *B60R 2300/105* (2013.01); *B60R 2300/303* (2013.01); *B60R 2300/605* (2013.01); *B60R 2300/802* (2013.01); *B60R 2300/8046* (2013.01)

(56) References Cited

U.S. PATENT DOCUMENTS

| | | | | |
|---|---|---|---|---|
| 2009/0079553 | A1* | 3/2009 | Yanagi | B60R 1/00 |
| | | | | 340/435 |
| 2014/0055616 | A1* | 2/2014 | Corcoran | H04N 5/247 |
| | | | | 348/148 |
| 2014/0327775 | A1* | 11/2014 | Cho | H04N 5/23216 |
| | | | | 348/148 |
| 2015/0224933 | A1* | 8/2015 | Higgins-Luthman | |
| | | | | G06K 9/00805 |
| | | | | 348/118 |
| 2017/0341583 | A1* | 11/2017 | Zhang | B60R 1/00 |
| 2017/0349098 | A1* | 12/2017 | Uhm | B60K 35/00 |
| 2019/0202355 | A1* | 7/2019 | Tatara | B60R 1/00 |
| 2019/0248288 | A1* | 8/2019 | Oba | G06T 3/00 |

FOREIGN PATENT DOCUMENTS

| | | |
|---|---|---|
| DE | 102010038825 A1 | 2/2011 |
| EP | 2045133 A2 | 4/2009 |
| EP | 2045133 B1 | 5/2010 |
| JP | 2006-338566 A | 12/2006 |
| JP | 2008-230558 A | 10/2008 |
| JP | 2009-81666 A | 4/2009 |
| JP | 2010-287163 A | 12/2010 |
| JP | 2013118508 A | 6/2013 |
| JP | 2016189576 A | 11/2016 |
| JP | 2016-213759 A | 12/2016 |
| JP | 2017-16200 A | 1/2017 |

* cited by examiner

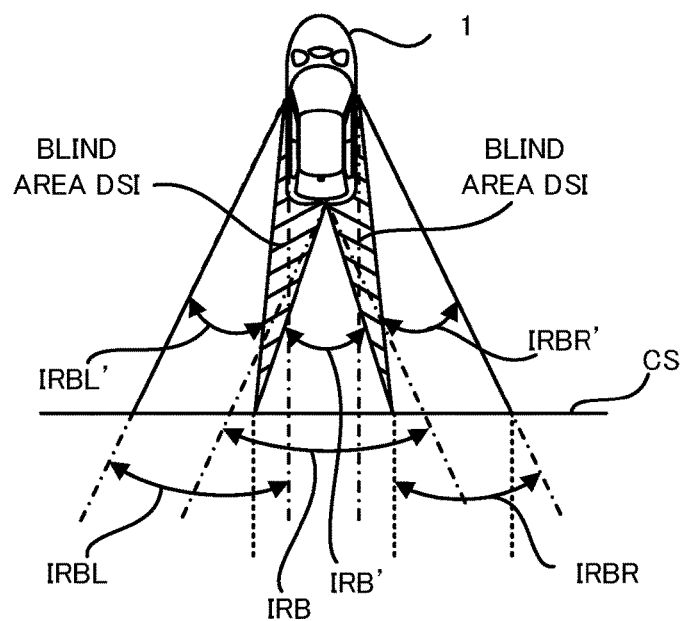
FIG. 6A
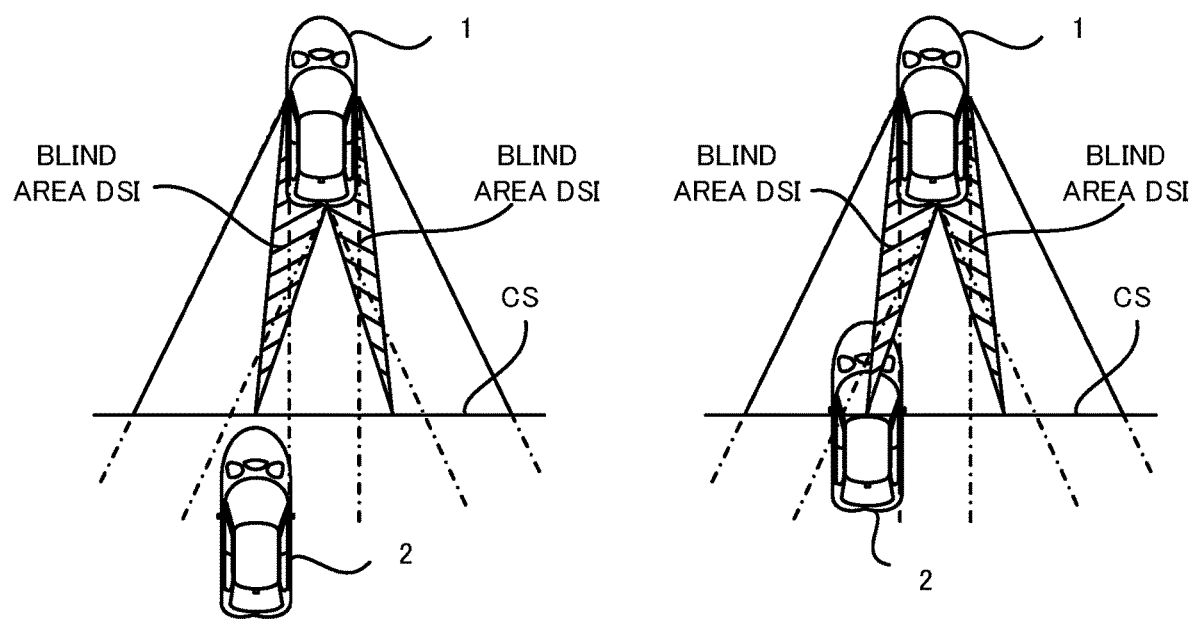
FIG. 6B
FIG. 6C

IMAGE DISPLAY APPARATUS

TECHNICAL FIELD

The present invention relates to a technical field of an image display apparatus that is configured to synthesize images that are captured by a plurality of cameras placed at a vehicle and to display the synthesized image, for example.

BACKGROUND ART

Each of a Patent Literature 1 and a Patent Literature 2 discloses one example of an image display apparatus. Specifically, the Patent Literature 1 discloses an image display apparatus that is configured to generate a synthesized image by synthesizing a rear side image (a rear and lateral image) that is captured by a camera configured to image a rear side area (a rear and lateral area) of a target vehicle and a rear image that is captured by a camera configured to image a rear area of the target vehicle seamlessly at the rear of the target vehicle so that the synthesized image is an image obtained by taking a view of the rear surroundings of the target vehicle from a virtual viewpoint and to display the generated synthesized image on a display apparatus of a vehicle interior mirror. The Patent Literature 2 discloses an image display apparatus that is configured to trim (crop) a rear right image that is captured by a camera configured to image a rear right area of a target vehicle and a rear left image that is captured by a camera configured to image a rear left area of the target vehicle on the basis of a distance between the target vehicle and a rear vehicle that travels at the rear of the target vehicle, to generate a synthesized image by synthesizing the trimmed rear left image and the trimmed rear right image so that the rear vehicle does not duplicate in the synthesized image and to display the generated synthesized image.

CITATION LIST

Patent Literature

[Patent Literature 1] Japanese Unexamined Patent Application Publication No. 2008-230558
[Patent Literature 2] Japanese Unexamined Patent Application Publication No. 2006-338566

SUMMARY OF INVENTION

Technical Problem

The image display apparatus disclosed in the Patent Literature 1 synthesizes the rear side image and the rear image without considering an existence of a rear vehicle that travels at the rear of the target vehicle. Therefore, the image display apparatus disclosed in the Patent Literature 1 has a technical problem that there is a possibility that the image display apparatus is not allowed to synthesize the rear side image and the rear image to generate the synthesized image in which a visibility of the rear vehicle is secured appropriately when there is the rear vehicle.

On the other hand, the image display apparatus disclosed in the Patent Literature 2 adjusts a trimmed amount of each of the rear right image and the rear left image so that the rear vehicle does not duplicate when the image display apparatus generates the synthesized image. However, visibility of the rear vehicle is not necessarily secured in the synthesized image only by adjusting the trimmed amount so that the rear vehicle does not duplicate. Thus, the image display apparatus disclosed in the Patent Literature 2 also has a technical problem that there is a possibility that the image display apparatus is not allowed to synthesize the rear right image and the rear left image to generate the synthesized image in which the visibility of the rear vehicle is secured appropriately when there is the rear vehicle.

The above described technical problem is one example of the technical problem to be solved by the present invention. It is therefore an object of the present invention to provide, for example, an image display apparatus that is configured to generate a synthesized image by synthesizing a plurality of images that are captured by a plurality of imaging devices placed at a first vehicle, respectively, and that is configured to generate the synthesized image in which a visibility of a second vehicle is secured appropriately when there is the second vehicle at the rear of the first vehicle.

Solution to Problem

One aspect of an image display apparatus of the present invention is provided with: a setting device that is configured to set, at a position that is away backwardly from a first vehicle, a virtual synthesizing plane that intersects with a front to rear axis of the first vehicle; a synthesizing device that is configured to synthesize a rear image and a rear side image to generate a synthesized image in which a scene in the rear image and a scene in the rear side image are seamlessly connected at a position of the synthesizing plane, wherein the rear image is captured by a rear imaging device that is configured to image a rear area located at the rear of the first vehicle and the rear side image is captured by a rear side imaging device that is configured to image a rear side area located at the rear and the side of the first vehicle; and a displaying device that is configured to display the synthesized image, the setting device is configured to set the synthesizing plane at a position that is different from a position at which the synthesizing plane is set when a detect apparatus does not detect that a second vehicle exists at the rear of the first vehicle, when the detect apparatus detects that the second vehicle exists at the rear of the first vehicle.

BRIEF DESCRIPTION OF DRAWINGS

FIG. 6A is a planar view that illustrates a blind area in that is not included in the synthesized image and that is caused by the image synthesizing process, FIG. 6B is a planar view that illustrates a rear vehicle that is not located in the blind area and FIG. 6C is a planar view that illustrates a rear vehicle that is located in the blind area.

DESCRIPTION OF EMBODIMENTS

Hereinafter, with reference to drawings, one embodiment of the image display apparatus of the present invention will be described. In the following description, a vehicle 1 to which one embodiment of the image display apparatus of the present invention is adapted will be described.

(1) Structure of Vehicle 1

Figure 1:
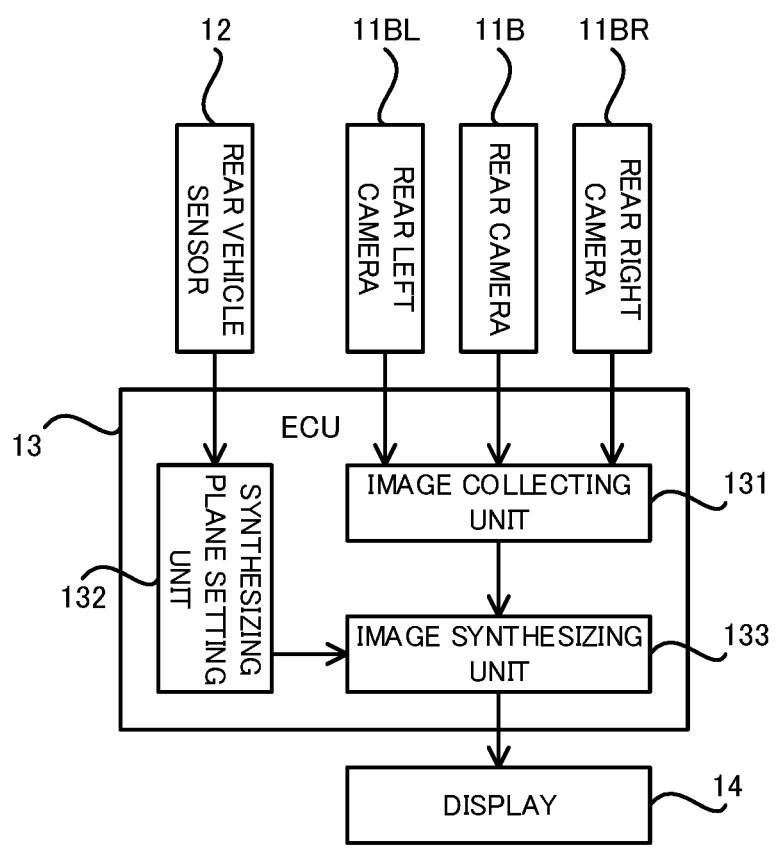
FIG. 1 is a block diagram that illustrates a structure of a vehicle in a present embodiment.
Figure 2:
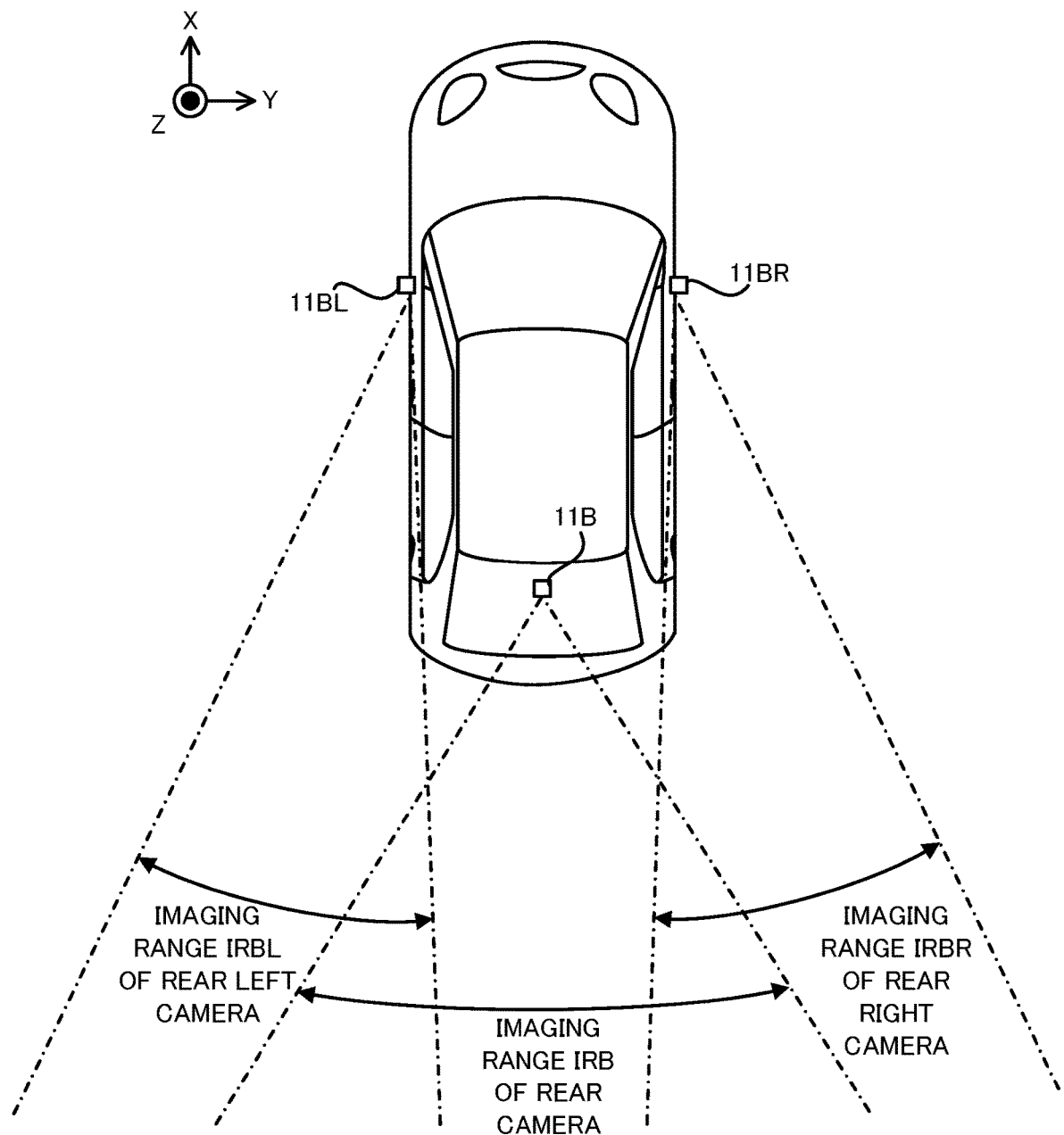
FIG. 2 is a planer view that illustrates positions at which a rear camera, a rear left camera and a rear right camera are placed, respectively, and an imaging range of each of the rear camera, the rear left camera and the rear right camera in the vehicle in the present embodiment.

Firstly, with reference to FIG. 1 and FIG. 2, the structure of the vehicle 1 in the present embodiment will be explained. FIG. 1 is a block diagram that illustrates the structure of the vehicle 1 in a present embodiment. FIG. 2 is a planer view that illustrates positions at which a rear camera 11B, a rear left camera 11BL and a rear right camera 11BR are placed, respectively, and an imaging range of each of the rear camera 11B, the rear left camera 11BL and the rear right camera 11BR in the vehicle 1 in the present embodiment. Note that the "right", the "left" and the "rear" mean the "right", the "left" and the "rear" based on a traveling direction of the vehicle 1, respectively, in the below described description, if there is no annotation. Moreover, in the below described description, the embodiment will be described by using an XYZ coordinate system in which rightward corresponds to "toward +Y direction", a leftward corresponds to "toward −Y direction", backward (rearward) corresponds to "toward −X direction", frontward corresponds to "toward +X direction", upward corresponds to "toward +Z direction", and downward corresponds to "toward −Z direction".

As illustrated in FIG. 1, the vehicle 1 has: the rear camera 11B that is one example of a "rear imaging device" or a "rear imager" in a below described additional statement; the rear left camera 11BL that is one example of a "rear side imaging device" or a "rear side imager" in the below described additional statement; the rear right camera 11BR that is one example of the "rear side imaging device" or the "rear side imager" in the below described additional statement; a rear vehicle sensor 12; an ECU (Electronic Control Unit) 13 that is one example of the "controller" in the below described additional statement; and a display 14 that is one example of a "displaying device" or a "display" in the below described additional statement.

The rear camera 11B is an imaging device that is configured to image (in other words, capture an image of) a rear area located at the rear (especially, just at the rear) of the vehicle 1 (namely, located at a backward position viewed from the vehicle 1), as illustrated in FIG. 2. The rear area corresponds to an area including at least one portion of an area that is reflected in a back mirror, under the assumption that the back mirror is placed in the vehicle interior (in other words, a cabin) of the vehicle 1. Namely, the rear camera 11B is used as a substitute of the back mirror placed at the vehicle interior of the vehicle 1 and constitutes one portion of what we call an electronic mirror, in the present embodiment. An imaging center of the rear camera 11B is just at the rear of the vehicle 1, in order to image the rear area of the vehicle 1. Namely, an optical axis of an optical system such as a lens of the rear camera 11B extends backwardly and straightforwardly from the vehicle 1. As a result, an imaging range (in other words, an angle of an imaging field) IRB that is imaged by the rear camera 11B is set to include the rear area.

The rear left camera 11BL is an imaging device that is configured to image a rear left area located at the rear of the vehicle 1 and at the left of the vehicle 1 (namely, located at a backward and leftward position viewed from the vehicle 1), as illustrated in FIG. 2. The rear left area corresponds to an area including at least one portion of an area that is reflected in a door mirror placed at a left door when the left door is in the closed state (in other words, the left door is closed), under the assumption that the door mirror is placed at the left door of the vehicle 1 that is placed at the left side of the vehicle 1. Namely, the rear left camera 11BL is used as a substitute of the door mirror placed at the left door of the vehicle 1 and constitutes one portion of what we call an electronic mirror, in the present embodiment. An imaging center of the rear left camera 11BL is at the left of vehicle 1 and at the rear of the vehicle 1, in order to image the rear left area of the vehicle 1. In other words, the imaging center of the rear left camera 11BL is at the left of the imaging center of the rear camera 11B. Namely, an optical axis of an optical system such as a lens of the rear left camera 11BL extends backward at the left of the above described optical axis of the optical system of the rear camera 11B. As a result, an imaging range (in other words, an angle of an imaging field) IRBL that is imaged by the rear left camera 11BL is set to include the rear left area. Note that the imaging range IRBL may overlaps partially with the imaging range IRB.

The rear right camera 11BR is an imaging device that is configured to image a rear right area located at the rear of the vehicle 1 and at the right of the vehicle 1 (namely, located at a backward and rightward position viewed from the vehicle 1), as illustrated in FIG. 2. The rear right area corresponds to an area including at least one portion of an area that is reflected in a door mirror placed at a right door when the right door is in a closed state (in other words, the right door is closed), under the assumption that the door mirror is placed at the right door of the vehicle 1 that is placed at the right side of the vehicle 1. Namely, the rear right camera 11BR is used as a substitute of the door mirror placed at the right door of the vehicle 1 and constitutes one portion of what we call an electronic mirror, in the present embodiment. An imaging center of the rear right camera 11BR is at the right of vehicle 1 and at the rear of the vehicle 1, in order to image the rear right area of the vehicle 1. In other words, the imaging center of the rear right camera 11BR is at the right of the imaging center of the rear camera 11B. Namely, an optical axis of an optical system such as a lens of the rear right camera 11BR extends backward at the right of the above described optical axis of the optical system of the rear camera 11B. As a result, an imaging range (in other words, an angle of an imaging field) IRBR that is imaged by the rear right camera 11BR is set to include the rear right area. Note that the imaging range IRBR may overlaps partially with the imaging range IRB.

The rear vehicle sensor 12 is a detecting device that is configured to detect another vehicle 2 that is located at the rear of the vehicle 1 (here, "at the rear of the vehicle 1" including not only "just at the rear of the vehicle 1" but also "at the rear and the left of the vehicle 1" and "at the rear and the right of the vehicle 1"). Hereinafter, another vehicle 2 is referred to as a "rear vehicle 2". The rear vehicle sensor 12 includes at least one of a radar, a LIDAR (Light Detection and Ranging) and a camera, for example. Note that at least one of the rear camera 11B, the rear left camera 11BL and the rear right camera 11BR may be used as the rear vehicle sensor 12.

The ECU 13 is configured to control entire operation of the vehicle 1. Especially in the present embodiment, the ECU 13 is configured to execute a display operation for displaying, at the display 14, a rear image 111B, a rear left image 111BL and a rear right image 111BR. The rear image 111B is an image that is captured by the rear camera 11B (namely, an image indicating a circumstance of the rear area). The rear left image 111BL is an image that is captured by the rear left camera 11BL (namely, an image indicating a circumstance of the rear left area). The rear right image 111BR is an image that is captured by the rear right camera 11BR (namely, an image indicating a circumstance of the rear right area). In order to perform the display operation, the ECU 13 includes, as processing blocks that are logically realized in the ECU 13, an image collecting unit 131, a synthesizing plane setting unit 132 that is one example of a "setting device" in the below described additional statement and an image synthesizing unit 133 that is one example of a "synthesizing device" in the below described additional statement.

The image collecting unit 131 is configured to collect the rear image 111B, the rear left image 111BL and the rear right image 111BR from the rear camera 11B, the rear left camera 11BL and the rear right camera 11BR, respectively.

Figure 3A:
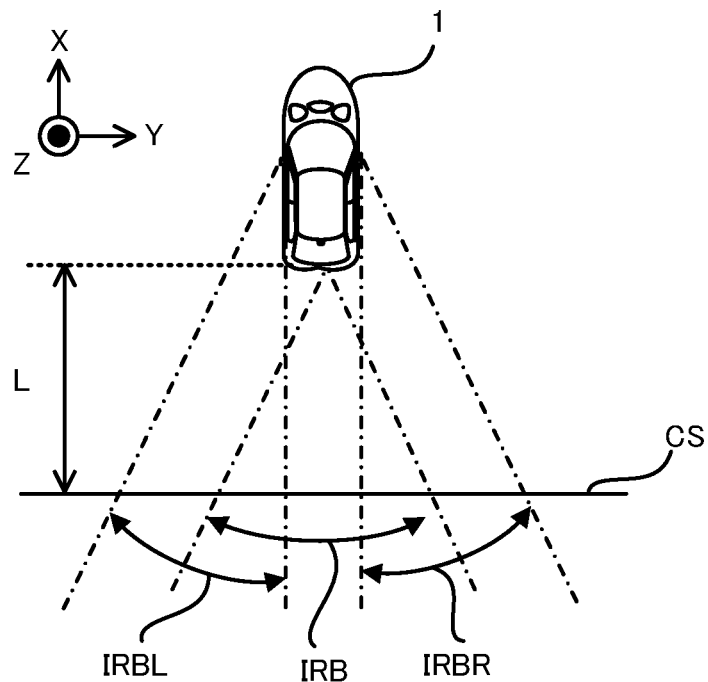
FIG. 3A and FIG. 3B is a planar view that illustrates a synthesizing plane that is set at the rear of the vehicle.
Figure 3B:
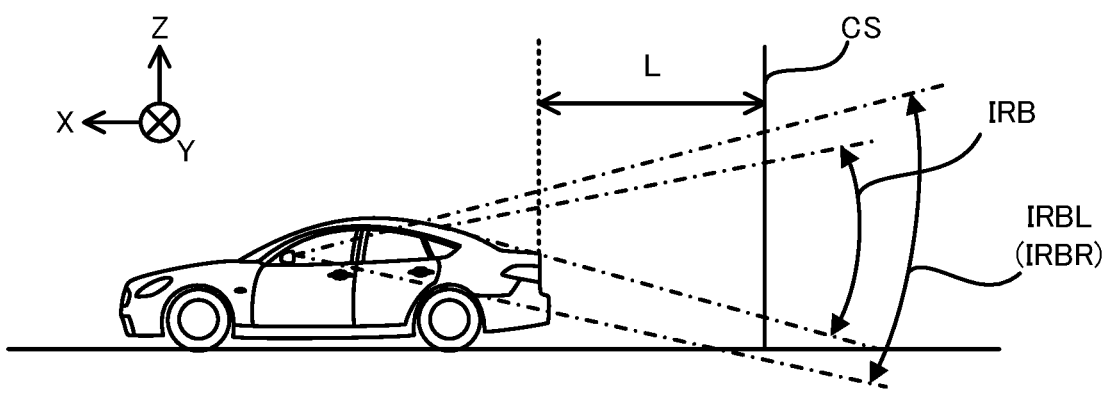

The synthesizing plane setting unit 132 is configured to set a synthesizing plane CS that is a parameter used to seamlessly synthesize (namely, connect) the rear image 111B, the rear left image 111BL and the rear right image 111BR. The synthesizing plane CS is a virtual plane set at a position that is away backward from the vehicle 1 by a predetermined distance L, as illustrated in FIG. 3A and FIG. 3B. The synthesizing plane CS is a plane that intersects with a front to rear axis (for example, a role axis, and an X axis in an example illustrated in FIG. 3A and FIG. 3B) of the vehicle 1. In an example illustrated in FIG. 3A and FIG. 3B, the synthesizing plane CS is a plane that is perpendicular to the front to rear axis of the vehicle 1. Namely, in an example illustrated in FIG. 3A and FIG. 3B, the synthesizing plane CS is a plane that ranges in a vertical direction.

The image synthesizing unit 133 is configured to generate a synthesized image 111C by executing an image synthesizing process for synthesizing the rear image 111B, the rear left image 111BL and the rear right image 111BR. Specifically, the image synthesizing unit 133 executes the image synthesizing process so that the rear image 111B, the rear left image 111BL and the rear right image 111BR are seamlessly connected on the synthesizing plane CS set by the synthesizing plane setting unit 132. Namely, the image synthesizing unit 133 executes the image synthesizing process on the synthesizing plane CS (namely, a scene at a position at which the synthesizing plane CS is set) in the rear image 111B, a scene on the synthesizing plane CS in the rear left image 111BL and a scene on the synthesizing plane CS in the rear right image 111BR are seamlessly connected.

Figure 4A:
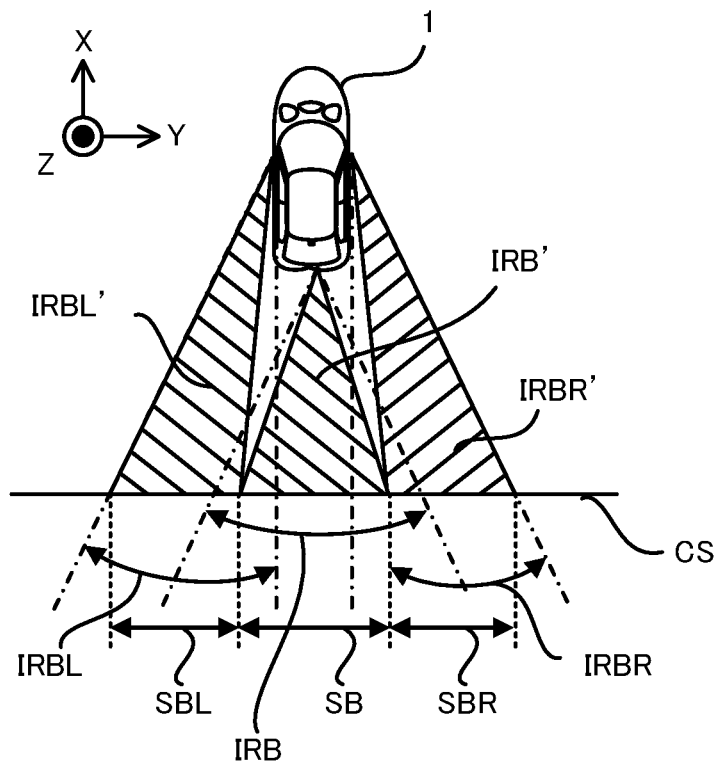
FIG. 4A is a planer view that schematically illustrates an image synthesizing process for generating a synthesized image.
Figure 4B:
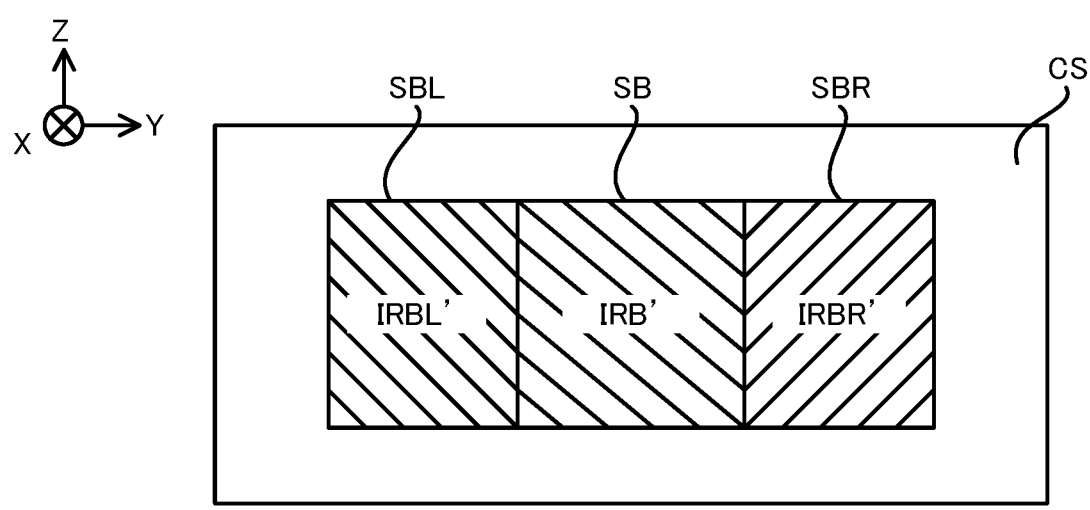
FIG. 4B is a planar view that illustrates an imaging range used by the image synthesizing process.

In this case, the image synthesizing unit 133 is configured to convert the rear image 111B into a rear image 112B that corresponds to an image obtained by the rear camera 11B when the rear camera 11B images an imaging range IRB' that is at least one portion of the imaging range IRB, as illustrated in FIG. 4A. Moreover, the image synthesizing unit 133 is configured to convert the rear left image 111BL into a rear left image 112BL that corresponds to an image obtained by the rear left camera 11BL when the rear left camera 11BL images an imaging range IRBL' that is at least one portion of the imaging range IRBL, as illustrated in FIG. 4A. Moreover, the image synthesizing unit 133 is configured to convert the rear right image 111BR into a rear right image 112BR that corresponds to an image obtained by the rear right camera 11BR when the rear right camera 11BR images an imaging range IRBR' that is at least one portion of the imaging range IRBR, as illustrated in FIG. 4A. The imaging range IRB', the imaging range IRBL' and the imaging range IRBR' are set to satisfy a requirement that (i) a left edge (in other words, a left side) of an overlapping area SB is next to a right edge of an overlapping area SBL and (ii) a right edge of the overlapping area SB is next to a left edge of an overlapping area SBR, as illustrated in FIG. 4B. The overlapping area SB is an area at which the imaging range IRB' overlaps with the synthesizing plane CS (in other words, the imaging range IRB' intersects with the synthesizing plane CS). The overlapping area SBL is an area at which the imaging range IRBL' overlaps with the synthesizing plane CS (in other words, the imaging range IRBL' intersects with the synthesizing plane CS). The overlapping area SBR is an area at which the imaging range IRBR' overlaps with the synthesizing plane CS (in other words, the imaging range IRBR' intersects with the synthesizing plane CS). Thus, the image synthesizing process executed by the image synthesizing unit 13 includes an image converting process for converting the rear image 111B, the rear left image 111BL and the rear right image 111BR into the rear image 112B, the rear left image 112BL and the rear right image 112BR, respectively. The image converting process may include an image extracting process for extracting, from the rear image 111B, an image part that is one portion of the rear image 111B (namely, a trimming process for trimming (in other words, cropping) an unnecessary image part of the rear image 111B). The image converting process may include an image extracting process for extracting, from the rear left image 111BL, an image part that is one portion of the rear left image 111BL (namely, a trimming process for trimming an unnecessary image part of the rear left image 111BL). The image converting process may include an image extracting process for extracting, from the rear right image 111BR, an image part that is one portion of the rear right image 111BR (namely, a trimming process for trimming an unnecessary image part of the rear right image 111BR). The image converting process may include an observing point converting process for converting an observing point (in other words, a viewpoint) of at least one of the rear image 111B, the rear left image 111BL and the rear right image 111BR (alternatively, the image part extracted by the image extracting process). The image converting process may include a scaling process for scaling (in other words, expanding and/or minifying) at least one of the rear image 111B, the rear left image 111BL and the rear right image 111BR (alternatively, the image part extracted by the image extracting process).

Figure 5:
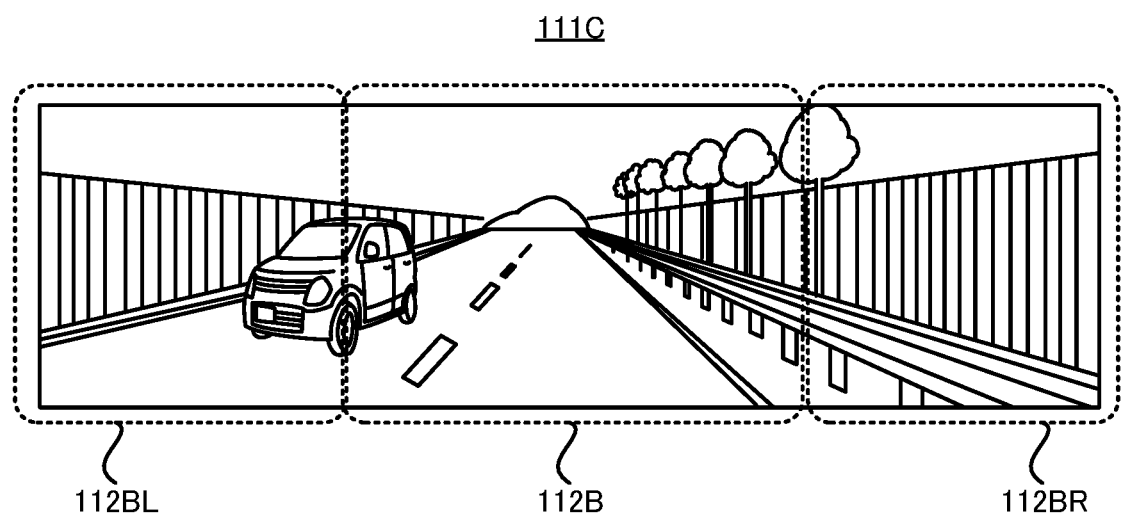
FIG. 5 is a planar view that illustrates a synthesized image generated by the image synthesizing process in the present embodiment.

Then, the image synthesizing unit 133 generates the synthesized image 111C in which the rear left area is located on the left of the rear area and the rear right area is located on the right of the rear area. Namely, the image synthesizing unit 133 generates the synthesized image 111C in which the rear left image 112BL is located on the left of the rear image 112B and the rear right image 112BR is located on the right of the rear image 112B, as illustrated in FIG. 5. Thus, the image synthesizing process executed by the image synthesizing unit 133 includes an image combining process for combining the rear image 112B, the rear left image 112BL and the rear right image 112BR.

Furthermore, the image synthesizing unit 133 is configured to control the display 14 to display the generated synthesized image 111C. Note that the display 14 is placed in the vehicle interior of the vehicle 1 and is configured to display the synthesized image 111C to an occupant (in other words, a person or a driver) of the vehicle 1 in the vehicle interior.

(2) Technical Problem Arising when Synthesized Image 111C is Generated

Next, with reference to FIG. 6A and FIG. 6B, a technical problem that may arises when the synthesized image 111C is generated by the above described image synthesizing process will be described.

As described above, the image synthesizing process includes (i) the image converting process for converting the rear image 111B obtained by imaging the imaging range IRB into the rear image 112B obtained by imaging the imaging range IRB', (ii) the image converting process for converting the rear left image 111BL obtained by imaging the imaging range IRBL into the rear left image 112BL obtained by imaging the imaging range IRBL' and (iii) the image converting process for converting the rear right image 111BR obtained by imaging the imaging range IRBR into the rear right image 112BR obtained by imaging the imaging range IRBR'. In this case, as illustrated in FIG. 6A, there may be a blind area DSI that is not included in the rear image 112B, the rear left image 112BL and the rear right image 112BR, depending on the relationship among the imaging range IRB, the imaging range IRBL, the imaging range IRBR, the imaging range IRB', the imaging range IRBL' and the imaging range IRBR'.

The blind area DSI typically exists between the vehicle 1 and the synthesizing plane CS, as illustrated in FIG. 6A. Therefore, even if the blind area DSI exists, the rear vehicle 2 is not located in the blind area DSI when the rear vehicle 2 is not located at a position that is away frontward from the synthesizing plane CS, as illustrated in FIG. 6B. Thus, a technical problem that at least one portion of the rear vehicle 2 is missing unnaturally in the synthesized image 111C does not arise. Namely, the image synthesizing unit 133 is capable of generating the synthesized image 111C that includes the rear vehicle 2 without a feeling of strangeness (namely, that includes the rear vehicle 2 whole of which is not missing unnaturally).

On the other hand, as illustrated in FIG. 6C, if the rear vehicle 2 is located at the position that is away frontward from the synthesizing plane CS when the blind area DSI exists, there is a possibility that at least one portion of the rear vehicle 2 is located in the blind area DSI. In this case, there is a possibility that at least one portion of the rear vehicle 2 (specifically, at least one portion of the rear vehicle 2 that is located in the blind area DSI) is missing in the synthesized image 111C. Namely, a technical problem that the image synthesizing unit 133 is not capable of generating the synthesized image 111C that includes the rear vehicle 2 without the feeling of strangeness arises.

One of reasons why this technical problem arises is that a position of the synthesizing plane CS (specifically, a relative position with respect to the vehicle 1) is fixed (namely, is not changeable). Thus, the present embodiment solves this technical problem by using the synthesizing plane setting unit 132 that is configured to set the synthesizing plane CS at a variable position (namely, configured to change the position of the synthesizing plane CS). Next, a synthesizing plane set operation for setting the synthesizing plane CS will be described in detail.

(3) Flow of Synthesizing Plane Set Operation

Figure 7:
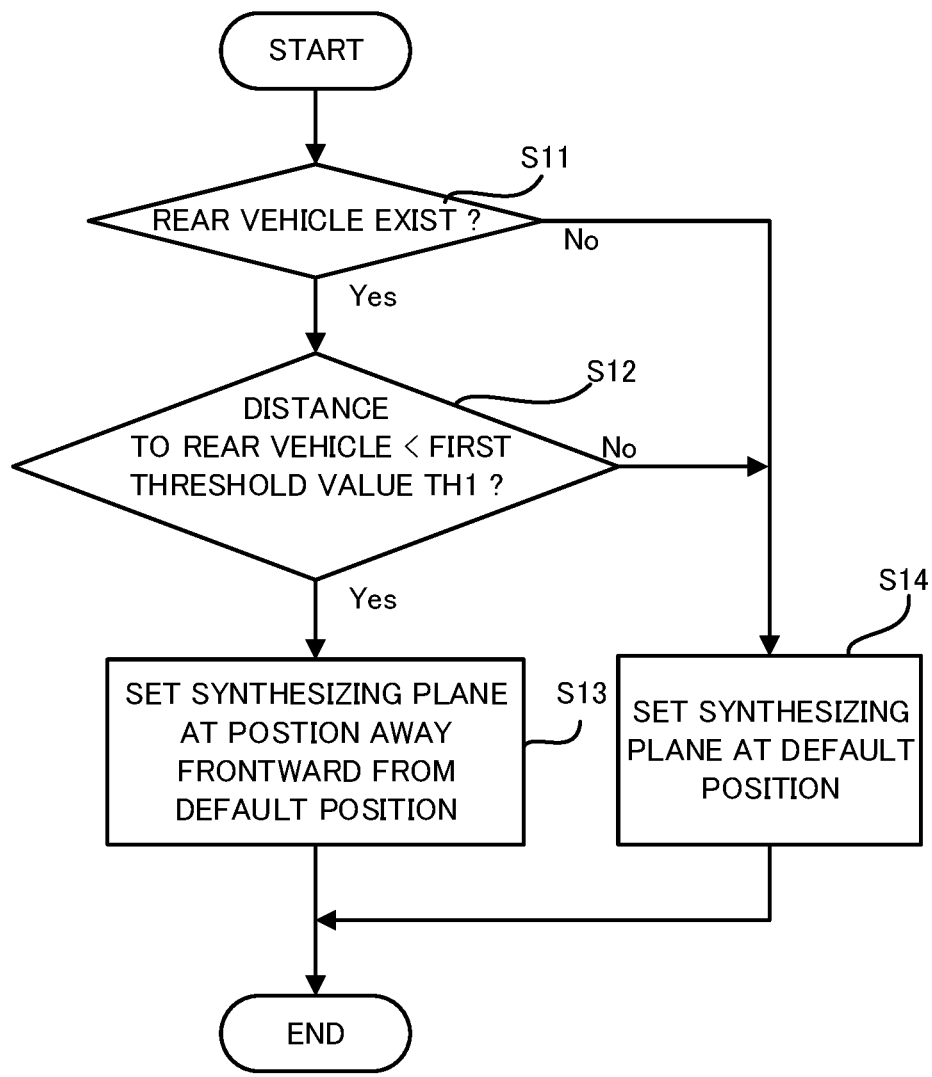
FIG. 7 is a flowchart that illustrates a flow of a synthesizing plane set operation for setting the synthesizing plane.

Next, with reference to FIG. 7, a flow of the synthesizing plane set operation for setting the synthesizing plane CS will be described. FIG. 7 is a flowchart that illustrates the flow of the synthesizing plane set operation for setting the synthesizing plane CS.

As illustrated in FIG. 7, the synthesizing plane setting unit 132 determines on the basis of a detected result of the rear vehicle sensor 12 whether or not the rear vehicle 2 exists (a step S11). Namely, the synthesizing plane setting unit 132 determines whether or not the rear vehicle 2 is detected by the rear vehicle sensor 12.

As a result of the determination at the step S11, if it is determined that the rear vehicle 2 does not exist (namely, the rear vehicle 2 is not detected by the rear vehicle sensor 12) (the step S11: No), the synthesizing plane setting unit 132 sets the synthesizing plane CS at a default position (in other words, an initial or usual position) (a step S14). The default position is set in advance with respect to the vehicle 1. The default positon is a position that is away backward from the vehicle 1 by a predetermined first distance L1 (for example, twelve meters).

On the other hand, as a result of the determination at the step S11, if it is determined that the rear vehicle 2 exists (namely, the rear vehicle 2 is detected by the rear vehicle sensor 12) (the step S11: Yes), the synthesizing plane setting unit 132 determines on the basis of the detection result of the rear vehicle sensor 2 whether or not a distance between the vehicle 1 and the rear vehicle 2 is shorter than a predetermined first threshold value TH1 (a step S12). Hereinafter, the distance between the vehicle 1 and the rear vehicle 2 is referred to as an "inter-vehicular distance L12".

The first threshold value TH1 is set to an appropriate value by which a situation where the image synthesizing unit 133 is capable of generating the synthesized image 111C that includes the rear vehicle 2 without the feeling of strangeness even when the synthesizing plane CS is set at the default position can be distinguished from a situation where the image synthesizing unit 133 is not capable of generating the synthesized image 111C that includes the rear vehicle 2 without the feeling of strangeness if the synthesizing plane CS is set at the default position on the basis of the inter-vehicular distance L12. Considering the above described technical problem, as the inter-vehicular distance L12 becomes shorter, there is a higher possibility that the image synthesizing unit 133 is not capable of generating the synthesized image 111C that includes the rear vehicle 2 without the feeling of strangeness if the synthesizing plane CS is set at the default position. Thus, a situation where the inter-vehicular distance L12 is shorter than the first threshold value TH1 corresponds to the situation where the image synthesizing unit 133 is not capable of generating the synthesized image 111C that includes the rear vehicle 2 without the feeling of strangeness if the synthesizing plane CS is set at the default position. On the other hand, a situation where the inter-vehicular distance L12 is longer than the first threshold value TH1 corresponds to the situation where the image synthesizing unit 133 is capable of generating the synthesized image 111C that includes the rear vehicle 2 without the feeling of strangeness even when the synthesizing plane CS is set at the default position. A distance between the vehicle 1 and the default position of the synthesizing plane CS (namely, the above described first distance L1) or a distance that is longer than the first distance L1 is one example of the first threshold value TH1 that satisfies the above described requirement, for example.

As a result of the determination at the step S12, if it is determined that the inter-vehicular distance L12 is longer than the first threshold value TH1 (the step S12: No), the image synthesizing unit 133 will be capable of generating the synthesized image 111C that includes the rear vehicle 2 without the feeling of strangeness even when the synthesizing plane CS is set at the default position. Thus, in this case, the synthesizing plane setting unit 132 sets the synthesizing plane CS at the default position (the step S14).

On the other hand, as a result of the determination at the step S12, if it is determined that the inter-vehicular distance L12 is shorter than the first threshold value TH1 (the step S12: Yes), the image synthesizing unit 133 will not be capable of generating the synthesized image 111C that includes the rear vehicle 2 without the feeling of strangeness if the synthesizing plane CS is set at the default position. Thus, in this case, the synthesizing plane setting unit 132 sets the synthesizing plane CS at a position that is different from the default position (the step S13). Specifically, the synthesizing plane setting unit 132 sets the synthesizing plane CS at a position that is away frontward from the default position.

The synthesizing plane setting unit 132 sets the synthesizing plane CS on the basis of the inter-vehicular distance L12. Namely, the synthesizing plane setting unit 132 sets the synthesizing plane CS at a position determined on the basis of the inter-vehicular distance L12. Specifically, the synthesizing plane setting unit 132 sets the synthesizing plane CS so that synthesizing plane CS is closer to the vehicle 1 sequentially or stepwisely as the inter-vehicular distance L12 becomes shorter. However, if the image synthesizing unit 133 is capable of generating the synthesized image 111C that includes the rear vehicle 2 without the feeling of strangeness even when the synthesizing plane CS is not set at the position determined on the basis of the inter-vehicular distance L12, the synthesizing plane setting unit 132 may set the synthesizing plane CS without considering the inter-vehicular distance L12.

As described above, the blind area DSI exists between the vehicle 1 and the synthesizing plane CS. Namely, if the rear vehicle 2 is located at a position that is away frontward from the synthesizing plane CS, there is a possibility that the image synthesizing unit 133 is not capable of generating the synthesized image 111C that includes the rear vehicle 2 without the feeling of strangeness. Thus, the synthesizing plane setting unit 132 sets the synthesizing plane CS at a position that is away frontward from the rear vehicle 2 (this position may include a position at which a front edge of the rear vehicle 2 exists). As a result, the synthesizing plane setting unit 132 is capable of setting the synthesizing plane CS that allows the image synthesizing unit 133 to generate the synthesized image 111C that includes the rear vehicle 2 without the feeling of strangeness. Namely, an operation of setting the synthesizing plane CS at a position that is away frontward from the rear vehicle 2 is substantially equivalent to an operation of setting the synthesizing plane CS at a position that allows the image synthesizing unit 133 to generates the synthesized image 111C that includes the rear vehicle 2 without the feeling of strangeness. Note that the operation of setting the synthesizing plane CS at the position that is away frontward from the rear vehicle 2 is also one example of the operation of setting the synthesizing plane CS on the basis of the inter-vehicular distance L12.

After the synthesizing plane CS is set at the step S13 or the step S14, the synthesizing plane setting unit 132 terminates the synthesizing plane set operation illustrated in FIG. 7. Then, after a predetermine time elapses, the synthesizing plane setting unit 132 starts to execute the synthesizing plane set operation illustrated in FIG. 7 again. Namely, the synthesizing plane set operation illustrated in FIG. 7 is executed repeatedly with a predetermined cycle.

In the above described description, if it is determined that the inter-vehicular distance L12 is same as the first threshold value TH1 as a result of the determination at the step S12, the synthesizing plane setting unit 132 executes the process that is executed when it is determined that the inter-vehicular distance L12 is longer than the first threshold value TH1. However, if it is determined that the inter-vehicular distance L12 is same as the first threshold value TH1, the synthesizing plane setting unit 132 may execute the process that is executed when it is determined that the inter-vehicular distance L12 is shorter than the first threshold value TH1.

(4) Technical Effect

As described above, in the present embodiment, the position of the synthesizing plane CS is changeable. Thus, the image synthesizing unit 133 is capable of generating the synthesized image 111C that includes the rear vehicle 2 without the feeling of strangeness on the basis of the synthesizing plane CS set at the variable position. Namely, the image synthesizing unit 133 is capable of generating the synthesized image 111C that includes the rear vehicle 2 without the feeling of strangeness even when the rear vehicle 2 exists.

Figure 8A:
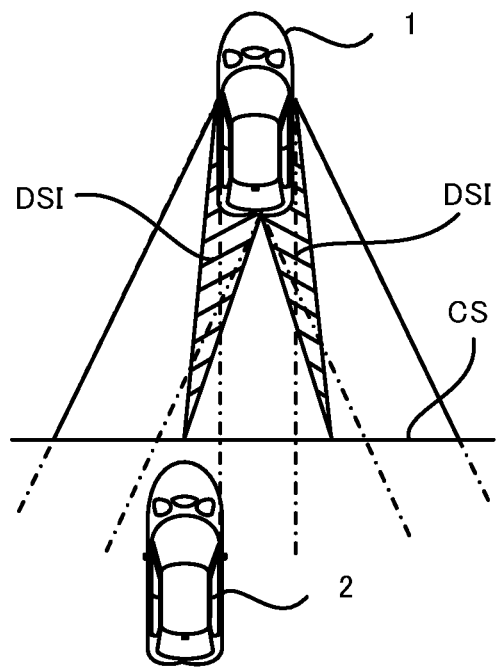
FIG. 8A is a planar view that illustrates a position of the synthesizing plane and a positional relationship between the rear vehicle and the blind area that is generated when a distance between the vehicle and the rear vehicle is longer than a first threshold value.
Figure 8B:
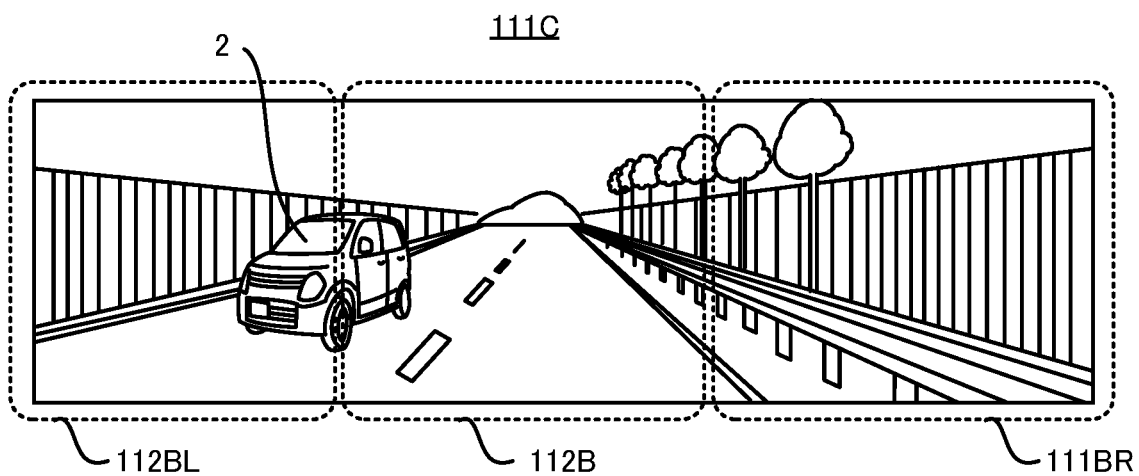
FIG. 8B is a planar view that illustrates the synthesized image generated in the situation illustrated in FIG. 8A.

Specifically, for example, FIG. 8A is a planar view that illustrates a position of the synthesizing plane CS and a positional relationship between the rear vehicle 2 and the blind area DSI that is generated when the inter-vehicular distance L12 is longer than the first threshold value TH1. In this case, the synthesizing plane setting unit 132 sets the synthesizing plane CS at the default position, as described above. Even when the synthesizing plane CS is set at the default position, the rear vehicle 2 does not exist in the blind area DSI as long as the inter-vehicular distance L12 is longer than the first threshold value TH1. Thus, as illustrated in FIG. 8B, the image synthesizing unit 133 is capable of generating the synthesized image 111C that includes the rear vehicle 2 without the feeling of strangeness.

Figure 9A:
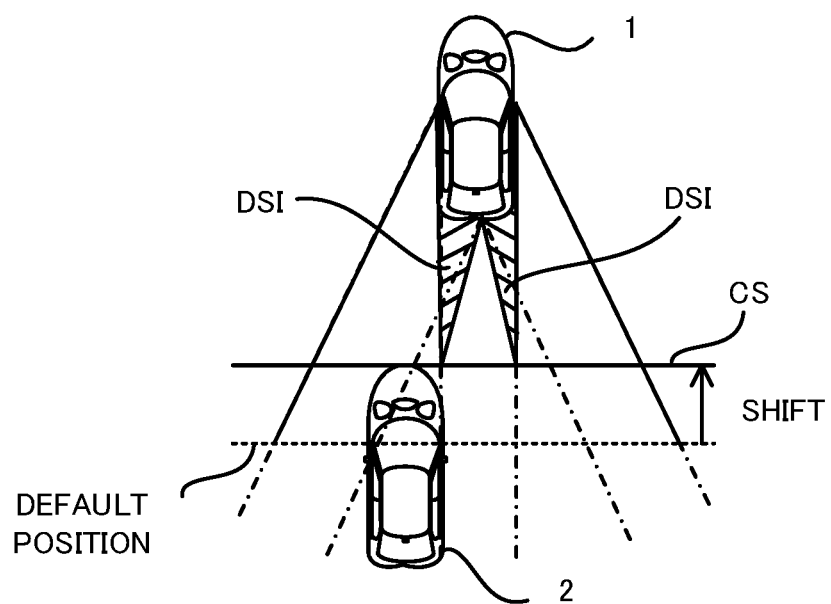
FIG. 9A is a planar view that illustrates a position of the synthesizing plane and a positional relationship between the rear vehicle and the blind area that is generated when the distance between the vehicle and the rear vehicle is shorter than the first threshold value.
Figure 9B:
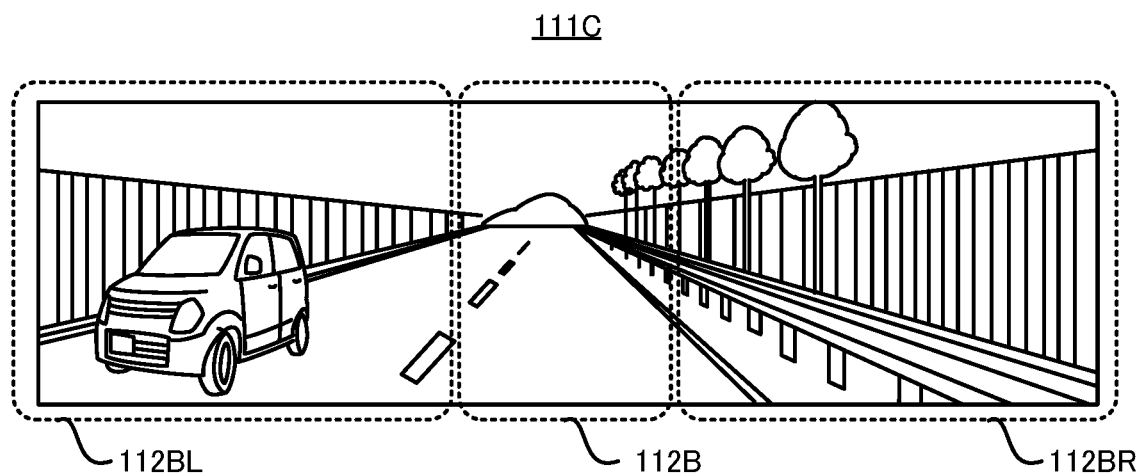
FIG. 9B is a planar view that illustrates the synthesized image generated in the situation illustrated in FIG. 9A.

On the other hand, FIG. 9A is a planar view that illustrates a position of the synthesizing plane CS and a positional relationship between the rear vehicle 2 and the blind area DSI that is generated when the inter-vehicular distance L12 is shorter than the first threshold value TH1. In this case, if the synthesizing plane CS is set at the default position, the rear vehicle 2 exists in the blind area DSI (see FIG. 6C). Thus, in this case, the synthesizing plane setting unit 132 sets the synthesizing plane CS at the position that is away frontward from the default position (especially, a position that is away frontward from a position of the rear vehicle 2 or the rear vehicle 2 itself), as described above. As a result, even when the inter-vehicular distance L12 is shorter than the first threshold value TH1, the rear vehicle 2 does not exist in the blind area DSI. Thus, as illustrated in FIG. 9B, the image synthesizing unit 133 is capable of generating the synthesized image 111C that includes the rear vehicle 2 without the feeling of strangeness.

(5) Modified Example

Next, modified examples will be described.

(5-1) Modified Example of Synthesizing Plane Set Operation

Figure 10:
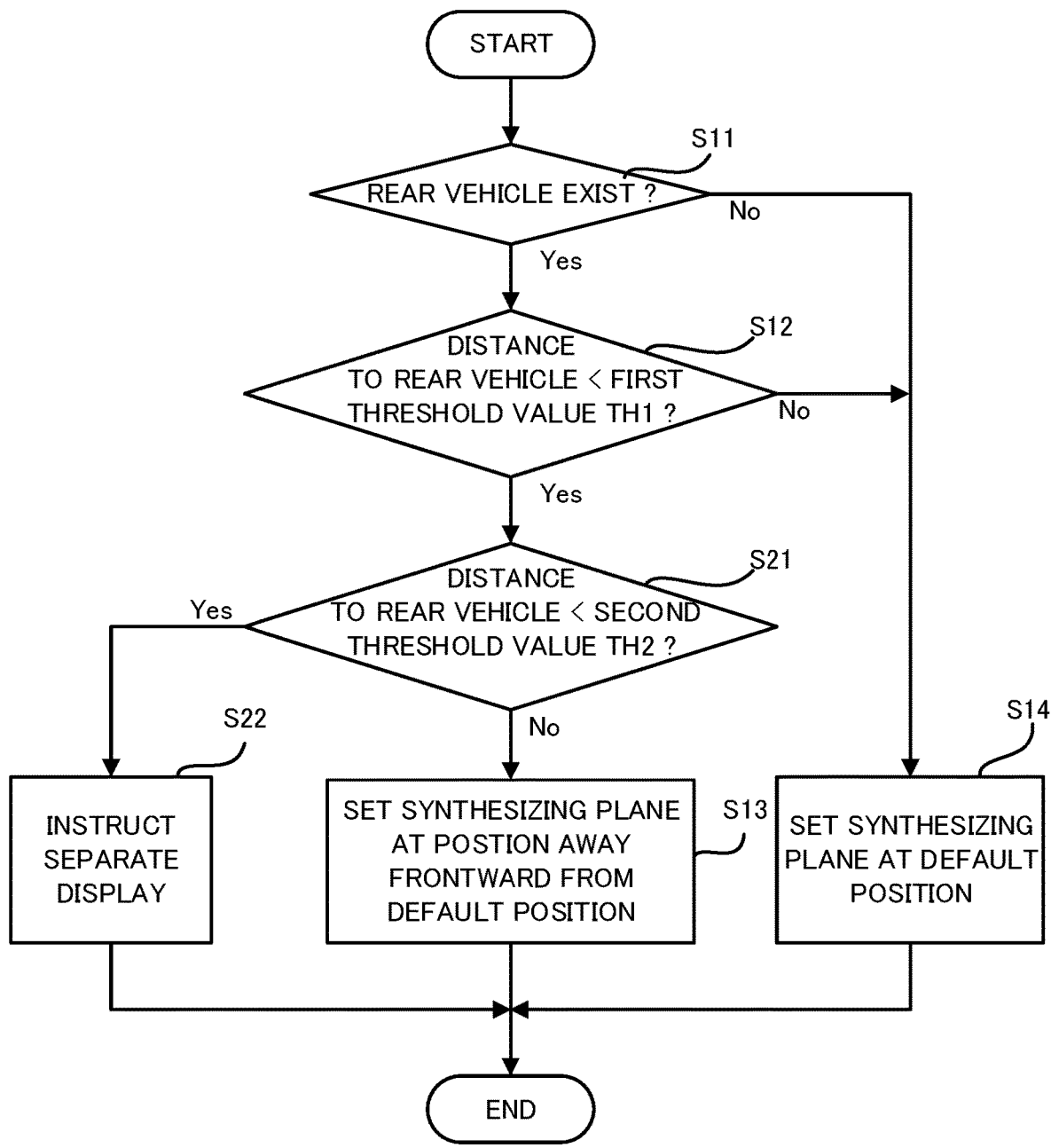
FIG. 10 is a flowchart that illustrates a flow of a modified example of the synthesizing plane set operation for setting the synthesizing plane.

Firstly, with reference to FIG. 10, a modified example of the synthesizing plane set operation will be described. FIG. 10 is a flowchart that illustrates a flow of the modified example of the synthesizing plane set operation. Note that the detailed description of a process that is same as the process illustrated in the flowchart of FIG. 7 is omitted by assigning the same step number to this process.

As illustrated in FIG. 10, the synthesizing plane setting unit 132 determines whether or not the rear vehicle 2 exists, also in the modified example (the step S11). If it is determined that the rear vehicle 2 does not exist (the step S11: No), the synthesizing plane setting unit 132 sets the synthesizing plane CS at the default position (the step S14). If it is determined that the rear vehicle 2 exists (the step S11: Yes), the synthesizing plane setting unit 132 determines whether or not the inter-vehicular distance L12 is shorter than the first threshold value TH1 (the step S12). If it is determined that the inter-vehicular distance L12 is longer than the first threshold value TH1 (the step S12: No), the synthesizing plane setting unit 132 sets the synthesizing plane CS at the default position (the step S14).

On the other hand, if it is determined that the inter-vehicular distance L12 is shorter than the first threshold value TH1 (the step S12: Yes), the synthesizing plane setting unit 132 further determines whether or not the inter-vehicular distance L12 is shorter than a predetermined second threshold value TH2 that is smaller than the first threshold value TH1 (a step S21).

Figure 11:
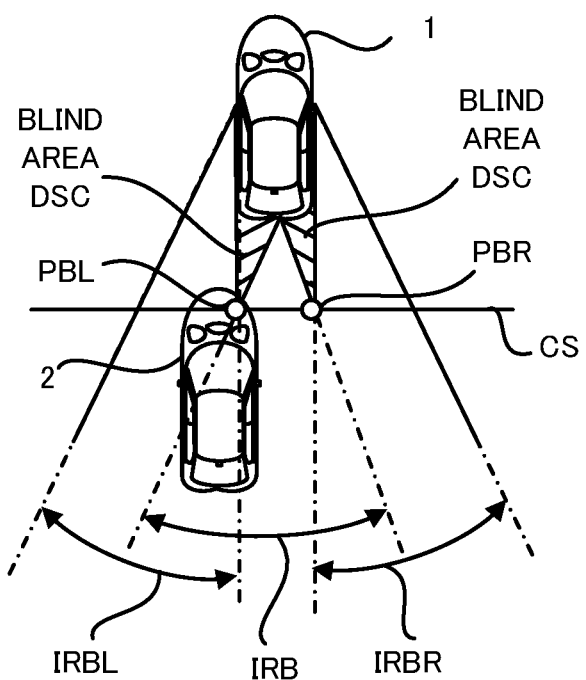
FIG. 11 is a planar view that illustrates the rear vehicle that is located in the blind area of the camera.

The second threshold value TH2 is set to an appropriate value by which a situation where the image synthesizing unit 133 is capable of generating the synthesized image 111C that includes the rear vehicle 2 without the feeling of strangeness if the position of the synthesizing plane CS is changed can be distinguished from a situation where the image synthesizing unit 133 is not capable of generating the synthesized image 111C that includes the rear vehicle 2 without the feeling of strangeness even if the position of the synthesizing plane CS is changed (more specifically, even if the synthesizing plane CS comes closer to the vehicle 1) on the basis of the inter-vehicular distance L12. Here, with reference to FIG. 11, the situation where the image synthesizing unit 133 is not capable of generating the synthesized image 111C that includes the rear vehicle 2 without the feeling of strangeness even if the position of the synthesizing plane CS is changed will be described. As illustrated in FIG. 11, when the rear vehicle 2 comes closer to the vehicle 1, there is a possibility that the rear vehicle 2 is located at a position that is away frontward from an intersecting part PBL at which the imaging range IRBL of the rear left camera 11BL intersects with the imaging range IRB of the rear camera 11B and an intersecting part PBR at which the imaging range IRBR of the rear right camera 11BR intersects with the imaging range IRB of the rear camera 11B. In this case, there is a possibility that the rear vehicle 2 is located in a blind area DCS that is not included in the imaging range IRB, the imaging range IRBL and the imaging range IRBR. Namely, there is a possibility that the rear vehicle 2 is located in the blind area DCS that is not included in the rear image 111B, the rear left image 111BL and the rear right image 111BR. In this case, at least one portion of the rear vehicle 2 that is located in the blind area DSC is not imaged by the rear camera 11B, the rear left camera 11BL and the rear right camera 11BR at all. Thus, even if the position of the synthesizing plane CS is changed (namely, the above described blind area DSI is adjusted), the image synthesizing unit 133 is not capable of generating the synthesized image 111C that includes the rear vehicle 2 without the feeling of strangeness.

Considering the technical reason why the image synthesizing unit 133 is not capable of generating the synthesized image 111C that includes the rear vehicle 2 without the feeling of strangeness even if the position of the synthesizing plane CS is changed, as the inter-vehicular distance L12 becomes shorter, there is a higher possibility that the image synthesizing unit 133 is not capable of generating the synthesized image 111C that includes the rear vehicle 2 without the feeling of strangeness even if the position of the synthesizing plane CS is changed. Thus, a situation where the inter-vehicular distance L12 is shorter than the second threshold value TH2 corresponds to the situation where the image synthesizing unit 133 is not capable of generating the synthesized image 111C that includes the rear vehicle 2 without the feeling of strangeness even if the position of the synthesizing plane CS is changed. On the other hand, a situation where the inter-vehicular distance L12 is longer than the second threshold value TH2 corresponds to the situation where the image synthesizing unit 133 is capable of generating the synthesized image 111C that includes the rear vehicle 2 without the feeling of strangeness if the position of the synthesizing plane CS is changed. A second distance L2 that is a distance between the vehicle 1 and the intersecting parts PBL and PBR or a distance that is longer than the second distance L2 is one example of the second threshold value TH2 that satisfies the above described requirement, for example.

As a result of the determination at the step S21, if it is determined that the inter-vehicular distance L12 is longer than the second threshold value TH2 (the step S21: No), the image synthesizing unit 133 will be capable of generating the synthesized image 111C that includes the rear vehicle 2 without the feeling of strangeness if the synthesizing plane setting unit 132 changes the position of the synthesizing plane CS. Thus, in this case, the synthesizing plane setting unit 132 sets the synthesizing plane CS at the position that is different from the default position (the step S13).

Figure 12:
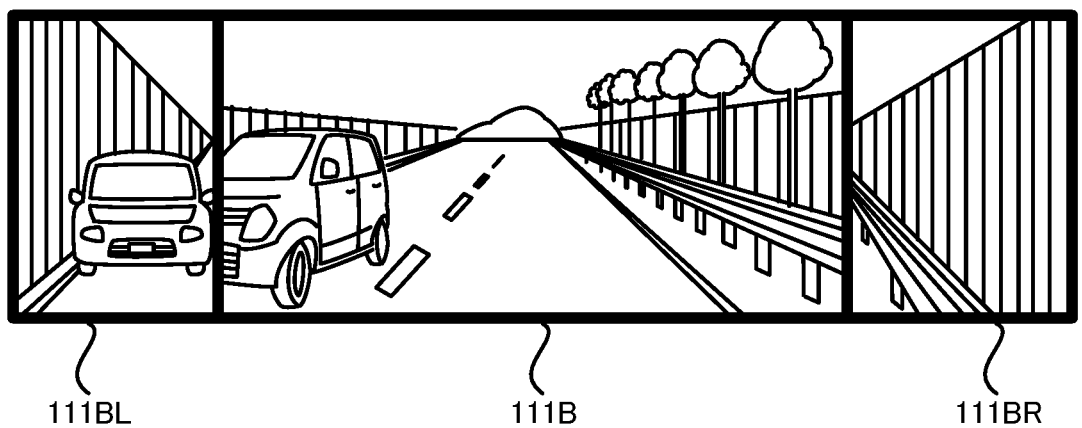
FIG. 12 is a planar view that illustrates an example in which the rear image, the rear left image and the rear right image are displayed separately without synthesizing them.

On the other hand, as a result of the determination at the step S21, if it is determined that the inter-vehicular distance L12 is shorter than the second threshold value TH2 (the step S21: Yes), the image synthesizing unit 133 will not be capable of generating the synthesized image 111C that includes the rear vehicle 2 without the feeling of strangeness even if the synthesizing plane setting unit 132 changes the position of the synthesizing plane CS. Namely, the image synthesizing unit 133 will be capable of generating only the synthesized image 111C that includes the rear vehicle 2 unnaturally or strangely (for example, the synthesized image 111C in which at least one portion of the rear vehicle 2 is missing) even if the position of the synthesizing plane CS is changed on the basis of the inter-vehicular distance L12. In this case, the synthesizing plane setting unit 132 controls the image synthesizing unit 133 to separately display the rear image 111B (alternatively, one portion of the rear image 111B), the rear left image 111BL (alternatively, one portion of the rear left image 111BL) and the rear right image 111BR (alternatively, one portion of the rear right image 111BR) without synthesizing them, instead of setting the synthesizing plane CS (a step S22). As a result, the image synthesizing unit 133 outputs, to the display 14, the rear image 111B, the rear left image 111BL and the rear right image 111BR (alternatively, extracts one portion of at least one of the rear image 111B, the rear left image 111BL and the rear right image 111BR and then outputs the extracted image portion to the display 14) without synthesizing them. Then, the display 14 separately displays the rear image 111B (alternatively, one portion of the rear image 111B), the rear left image 111BL (alternatively, one portion of the rear left image 111BL) and the rear right image 111BR (alternatively, one portion of the rear right image 111BR), as illustrated in FIG. 12.

According to the above described first modified example, a technical effect that is same as the above described technical effect can be achieved. Moreover, according to the first modified example, when the image synthesizing unit 133 is not be capable of generating the synthesized image 111C that includes the rear vehicle 2 without the feeling of strangeness even if the position of the synthesizing plane CS is changed, the rear image 111B (alternatively, one portion of the rear image 111B), the rear left image 111BL (alternatively, one portion of the rear left image 111BL) and the rear right image 111BR (alternatively, one portion of the rear right image 111BR) are displayed separately, as an exceptional case. Thus, a visibility of the rear vehicle 2 improves, compared to the case where the synthesized image 111C that includes the rear vehicle 2 unnaturally or strangely is displayed.

In the above described description, if it is determined that the inter-vehicular distance L12 is same as the second threshold value TH2 as a result of the determination at the step S21, the synthesizing plane setting unit 132 executes the process that is executed when it is determined that the inter-vehicular distance L12 is longer than the second threshold value TH2. However, if it is determined that the inter-vehicular distance L12 is same as the second threshold value TH2, the synthesizing plane setting unit 132 may execute the process that is executed when it is determined that the inter-vehicular distance L12 is shorter than the second threshold value TH2.

(5-2) Another Modified Example

In some cases, a size of the rear vehicle 2 in the rear image 111B is different from a size of the rear vehicle 2 in at least one of the rear left image 111BL and the rear right image 111BR relatively greatly. Specifically, a difference between the size of the rear vehicle 2 in the rear image 111B and the size of the rear vehicle 2 in at least one of the rear left image 111BL and the rear right image 111BR is larger than a predetermined amount. For example, in some cases, a horizontal or vertical size of the rear vehicle 2 in the rear image 111B is different from a horizontal or vertical size of the rear vehicle 2 in at least one of the rear left image 111BL and the rear right image 111BR relatively greatly. In this case, if the synthesized image 111C is generated by synthesizing the rear image 111B, the rear left image 111BL and the rear right image 111BR, there is a possibility that the size of the rear vehicle 2 in the synthesized image 111C is an unnatural or strange size that is different from an appropriate size based on the inter-vehicular distance L12 between the vehicle 1 and the rear vehicle 2. The reason is as follows. As described above, the image synthesizing process executed by the image synthesizing unit 133 includes the scaling process. Thus, the image synthesizing unit 133 has to scale the rear left image 111BL and the rear right image 111BR, in order to make the size of the rear vehicle 2 in the synthesized image 111C be same as the size of the rear vehicle 2 in the rear image 111B. As a result, there is a possibility that the size of the rear vehicle 2 in an image part that is one portion of the synthesized image 111C and that corresponds to the rear left image 111BL and the rear right image 111BR is greatly different from the size of the rear vehicle 2 in at least one of the rear left image 111BL and the rear right image 111BR. Alternatively, the image synthesizing unit 133 has to scale the rear image 111B, in order to make the size of the rear vehicle 2 in the synthesized image 111C be same as the size of the rear vehicle 2 in the rear left image 111BL and the rear right image 111BR. As a result, there is a possibility that the size of the rear vehicle 2 in an image part that is one portion of the synthesized image 111C and that corresponds to the rear image 111B is greatly different from the size of the rear vehicle 2 in the rear image 111B. In this case, there is a possibility that the occupant of the vehicle 1 misunderstands the size of the rear vehicle 2 when the occupant watches the synthesized image 111C. As a result, there is a possibility that the occupant of the vehicle 1 misunderstands the distance from the vehicle 1 to the rear vehicle 2. Thus, in a second modified example, if the size of the rear vehicle 2 in the rear image 111B is different from the size of the rear vehicle 2 in at least one of the rear left image 111BL and the rear right image 111BR, the synthesizing plane setting unit 132 controls the image synthesizing unit 133 to separately display the rear image 111B (alternatively, one portion of the rear image 111B), the rear left image 111BL (alternatively, one portion of the rear left image 111BL) and the rear right image 111BR (alternatively, one portion of the rear right image 111BR) without synthesizing them, instead of setting the synthesizing plane CS. Note that this process is same as the process at the step S22 in FIG. 10 in the above described first modified example. As a result, there is smaller or less possibility that the occupant of the vehicle 1 misunderstands the size of the rear vehicle 2 (furthermore, the distance to the rear vehicle 2).

Figure 13:
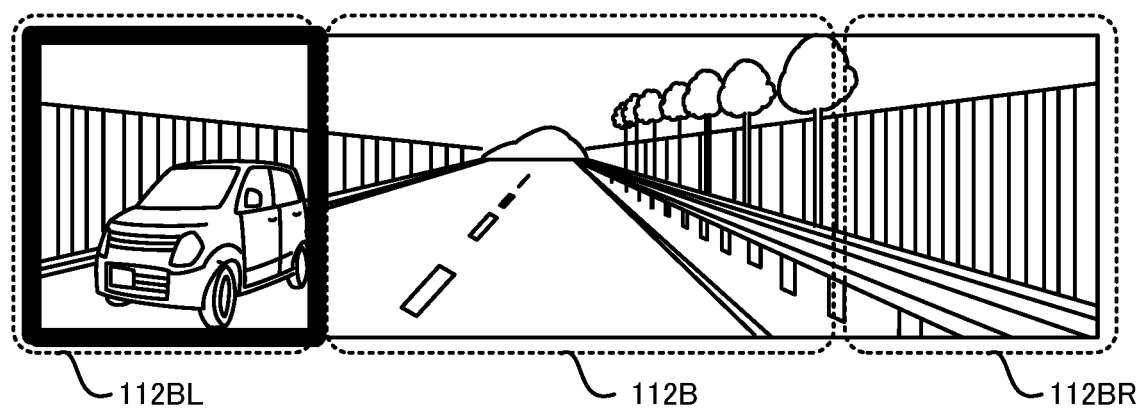
FIG. 13 is a planar view that illustrates an example in which the rear left image or the rear right image is highlighted.

When the rear vehicle 2 travels on a traveling lane (in other words, a driving lane) that is next to and at the left of a traveling lane on which the vehicle 1 travels, the ECU 13 may control the display 14 to highlight the rear left image 111BL or 112BL more than the rear left image 111BL or 112BL displayed in the other case. When the rear vehicle 2 travels on a traveling lane that is next to and at the right of the traveling lane on which the vehicle 1 travels, the ECU 13 may control the display 14 to highlight the rear right image 111BR or 112BR more than the rear right image 111BR or 112BR displayed in the other case. The highlighted display may be any display as long as the highlighted image is more outstanding or attractive than the non-highlighted image. For example, the highlight display may be a display for surrounding the image with a decorative frame, as illustrated in FIG. 13. This highlight display is allowed to appropriately inform the occupant of the vehicle 1 of the existence of the rear vehicle 2 traveling on a second traveling lane that is a destination of a lane change, when the occupant of the vehicle 1 intends to make the vehicle 1 change lane from a first traveling lane to the second traveling lane. Incidentally, when the rear vehicle 2 travels on a traveling lane that is same as the traveling lane on which the vehicle 1 travels, the ECU 13 may control the display 14 to highlight the rear image 111B or 112B more than the rear image 111B or 112B displayed in the otherwise case.

(6) Additional Statement

Relating to the above described embodiment, following additional statements will be disclosed.

(6-1) Additional Statement 1

An image display apparatus according to the additional statement 1 is provided with: a setting device that is configured to set, at a position that is away backward from a first vehicle, a virtual synthesizing plane that intersects with a front to rear axis of the first vehicle; a synthesizing device that is configured to synthesize a rear image and a rear side image to generate a synthesized image in which a scene in the rear image and a scene in the rear side image are seamlessly connected at a position of the synthesizing plane, wherein the rear image is captured by a rear imaging device that is configured to image a rear area located at the rear of the first vehicle and the rear side image is captured by a rear side imaging device that is configured to image a rear side area located at the rear and the side of the first vehicle; and a displaying device that is configured to display the synthesized image, the setting device is configured to set the synthesizing plane at a position that is different from a position at which the synthesizing plane is set when a detect apparatus does not detect that a second vehicle exists at the rear of the first vehicle, when the detect apparatus detects that the second vehicle exists at the rear of the first vehicle.

Alternatively, an image display apparatus according to the additional statement 1 may be provided with a controller and a display, the controller is programmed to: set, at a position that is away backward from a first vehicle, a virtual synthesizing plane that intersects with a front to rear axis of the first vehicle; and synthesize a rear image and a rear side image to generate a synthesized image in which a scene in the rear image and a scene in the rear side image are seamlessly connected at a position of the synthesizing plane, wherein the rear image is captured by a rear imager that is configured to image a rear area located at the rear of the first vehicle and the rear side image is captured by a rear side imager that is configured to image a rear side area located at the rear and the side of the first vehicle, the display is configured to display the synthesized image, the controller is programmed to set the synthesizing plane at a position that is different from a position at which the synthesizing plane is set when a detect apparatus does not detect that a second vehicle exists at the rear of the first vehicle, when the detect apparatus detects that the second vehicle exists at the rear of the first vehicle.

In the image display apparatus according to the additional statement 1, the synthesizing device (alternatively, the controller, same applies to the additional statement) generates the synthesized image in which the scene in the rear image and the scene in the rear side image are connected at the position of the synthesizing plane seamlessly (namely, without discontinuity at a border between the rear image and the rear side image). Namely, if the synthesizing plane is set at a position that is away backward from the first vehicle by a predetermined distance, the synthesizing device generates the synthesized image in which the scene in the rear image at a position that is away backward from the first vehicle by the predetermined distance and the scene in the rear side image at a position that is away backward from the first vehicle by the predetermined distance are connected seamlessly. Especially in the image display apparatus according to the additional statement 1, the position of the synthesizing plane that is equivalent to a position at which the scene in the rear image and the scene in the rear side image are connected seamlessly changes depending on an existence/a non-existence of the second vehicle. Thus, the image display apparatus according to the additional statement 1 is capable of changing (in other words, displacing or shifting) the position of the synthesizing plane so that a visibility of the second vehicle is secured appropriately. Specifically, the image display apparatus according to the additional statement 1 is capable of changing the position of the synthesizing plane to generate the synthesized image that includes the second vehicle without a feeling of strangeness (in other words, having a good visibility). Therefore, the image display apparatus according to the additional statement 1 is capable of synthesizing the rear image and the rear side image so that the visibility of the second vehicle is secured in the synthesized image when the second vehicle exist at the rear of the first vehicle, compared to an image display apparatus in a comparison example in which the position of the synthesizing plane is fixed (namely, is not changed) regardless of the existence and non-existence of the second vehicle.

(6-2) Additional Statement 2

An image display apparatus according to the additional statement 2 is the image display apparatus according to the additional statement 1, wherein the setting device is configured to set the synthesizing plane at a position that is away, toward the first vehicle, from the position at which the synthesizing plane is set when the detect apparatus does not detect that the second vehicle exists at the rear of the first vehicle, when the detect apparatus detects that the second vehicle exists at the rear of the first vehicle.

Alternatively, an image display apparatus according to the additional statement 2 may be the image display apparatus according to the additional statement 1, wherein the controller is programmed to set the synthesizing plane at a position that is away, toward the first vehicle, from the position at which the synthesizing plane is set when the detect apparatus does not detect that the second vehicle exists at the rear of the first vehicle, when the detect apparatus detects that the second vehicle exists at the rear of the first vehicle.

The image display apparatus according to the additional statement 2 is capable of changing the position of the synthesizing plane to generate the synthesized image that includes the second vehicle without the feeling of strangeness.

(6-3) Additional Statement 3

An image display apparatus according to the additional statement 3 is the image display apparatus according to the additional statement 1 or 2, wherein the setting device is configured to change a position at which the synthesizing plane is set, on the basis of a distance between the first vehicle and the second vehicle, when the detect apparatus detects that the second vehicle exists at the rear of the first vehicle.

Alternatively, an image display apparatus according to the additional statement 3 may be the image display apparatus according to the additional statement 1 or 2, wherein the controller is programmed to change a position at which the synthesizing plane is set, on the basis of a distance between the first vehicle and the second vehicle, when the detect apparatus detects that the second vehicle exists at the rear of the first vehicle.

The image display apparatus according to the additional statement 3 is capable of changing the position of the synthesizing plane on the basis of the distance between the first vehicle and the second vehicle to generate the synthesized image that includes the second vehicle without the feeling of strangeness.

(6-4) Additional Statement 4

An image display apparatus according to the additional statement 4 is the image display apparatus according to the additional statement 3, wherein the setting device is configured to set the synthesizing plane at a position that is closer to the first vehicle as the distance is shorter.

Alternatively, an image display apparatus according to the additional statement 4 may be the image display apparatus according to the additional statement 3, wherein the controller is programmed to set the synthesizing plane at a position that is closer to the first vehicle as the distance is shorter.

The image display apparatus according to the additional statement 4 is capable of changing the position of the synthesizing plane on the basis of the distance between the first vehicle and the second vehicle to generate the synthesized image that includes the second vehicle without the feeling of strangeness.

(6-5) Additional Statement 5

An image display apparatus according to the additional statement 5 is the image display apparatus according to any one of the additional statements 1 to 4, wherein the setting device is configured to set the synthesizing plane at a position that is away backward from the first vehicle and that is away frontward from the second vehicle, when the detect apparatus detects that the second vehicle exists at the rear of the first vehicle.

Alternatively, an image display apparatus according to the additional statement 5 may be the image display apparatus according to any one of the additional statements 1 to 4, wherein the controller is programmed to set the synthesizing plane at a position that is away backward from the first vehicle and that is away frontward from the second vehicle, when the detect apparatus detects that the second vehicle exists at the rear of the first vehicle.

The image display apparatus according to the additional statement 5 is capable of changing the position of the synthesizing plane to generate the synthesized image that includes the second vehicle without the feeling of strangeness (for example, that includes the second vehicle whole of which is not missing unnaturally).

(6-6) Additional Statement 6

An image display apparatus according to the additional statement 6 is the image display apparatus according to any one of the additional statements 1 to 5, wherein the setting device is configured to set the synthesizing plane so that the second vehicle is included in the synthesized image seamlessly, when the detect apparatus detects that the second vehicle exists at the rear of the first vehicle.

Alternatively, an image display apparatus according to the additional statement 6 may be the image display apparatus according to any one of the additional statements 1 to 5, wherein the controller is programmed to set the synthesizing plane so that the second vehicle is included in the synthesized image seamlessly, when the detect apparatus detects that the second vehicle exists at the rear of the first vehicle.

The image display apparatus according to the additional statement 6 is capable of changing the position of the synthesizing plane to generate the synthesized image that includes the second vehicle without the feeling of strangeness.

(6-7) Additional Statement 7

An image display apparatus according to the additional statement 7 is the image display apparatus according to any one of the additional statements 1 to 6, wherein the displaying device is configured to display the rear image and the rear side image separately instead of displaying the synthesized image, when a distance between the first vehicle and the second vehicle is shorter than a predetermined threshold value.

Alternatively, an image display apparatus according to the additional statement 7 may be the image display apparatus according to any one of the additional statements 1 to 6, wherein the display is configured to display the rear image and the rear side image separately instead of displaying the synthesized image, when a distance between the first vehicle and the second vehicle is shorter than a predetermined threshold value.

When the distance between the first vehicle and the second vehicle is shorter than the predetermined threshold value (namely, the second vehicle is very close to the first vehicle), there is a possibility that the image display apparatus is not capable of generating the synthesized image that includes the second vehicle without the feeling of strangeness only by changing the position of the synthesizing plane, as described above by using the drawing. In this case, the image display apparatus according to the additional statement 7 displays the rear image and the rear side image separately. Thus, the visibility of the second vehicle is secured more appropriately, compared to the case where the synthesized image including unnatural second vehicle (for example, the synthesized image including the second vehicle one portion of which is missing unnaturally) is kept to be displayed.

Note that the predetermined threshold value may be equal to or larger than a distance from the first vehicle to a position at which an imaging range of the rear imaging device (alternatively, the rear imager, same applies to the additional statement) and an imaging range of the rear side imaging device (alternatively, the rear side imager, same applies to the additional statement) intersect with each other. Moreover, when the displaying device (alternatively, the display, same applies to the additional statement) displays the rear image and the rear side image separately, the synthesizing device does not necessarily generate the synthesized image (6-8) Additional Statement 8

An image display apparatus according to the additional statement 8 is the image display apparatus according to any one of the additional statements 1 to 7, wherein the displaying device is configured to display the rear image and the rear side image separately instead of displaying the synthesized image, when a difference between a size of the second vehicle in the rear image and a size of the second vehicle in the rear side image is larger than a predetermined amount.

Alternatively, an image display apparatus according to the additional statement 8 may be the image display apparatus according to any one of the additional statements 1 to 7, wherein the display is configured to display the rear image and the rear side image separately instead of displaying the synthesized image, when a difference between a size of the second vehicle in the rear image and a size of the second vehicle in the rear side image is larger than a predetermined amount.

When the difference between the size of the second vehicle in the rear image and the size of the second vehicle in the rear side image is larger than the predetermined amount (namely, relatively large), there is a possibility that the size of the second vehicle in the synthesized image generated by synthesizing the rear image and the rear side image is a strange size (namely, a size that causes the feeling of the strangeness) that is different from an appropriate size based on the distance between the first vehicle and the second vehicle. In this case, there is a possibility that an occupant (namely, a driver, a person and so on) of the first vehicle misunderstands the size of the second vehicle, and as a result, misunderstands the distance to the second vehicle. The image display apparatus according to the additional statement 8 displays the rear image and the rear side image separately instead of displaying the synthesized image, when the difference between the size of the second vehicle in the rear image and the size of the second vehicle in the rear side image is larger than the predetermined amount. Thus, there is smaller or less possibility that the occupant of the first vehicle misunderstand the size of the second vehicle (furthermore, the distance to the second vehicle).

(6-9) Additional Statement 9

An image display apparatus according to the additional statement 9 is the image display apparatus according to any one of the additional statements 1 to 8, wherein the rear side imaging device is configured to image the rear side area located at the rear and one of the right and the left of the first vehicle, the displaying device is configured to highlight an image part of the synthesized image that corresponds to the rear side image more, when the second vehicle travels on a second traveling lane that is located at one of the right and the left of a first traveling lane on which the first vehicle travels, compared to the case where the second vehicle travels on the first traveling lane.

Alternatively, an image display apparatus according to the additional statement 9 may be the image display apparatus according to any one of the additional statements 1 to 8, wherein the rear side imager is configured to image the rear side area located at the rear and one of the right and the left of the first vehicle, the display is configured to highlight an image part of the synthesized image that corresponds to the rear side image more, when the second vehicle travels on a second traveling lane that is located at one of the right and the left of a first traveling lane on which the first vehicle travels, compared to the case where the second vehicle travels on the first traveling lane.

The image display apparatus according to the additional statement 9 is capable of informing the occupant of the first vehicle of the existence of the second vehicle traveling on the second traveling lane that is a destination of a lane change, when the occupant of the first vehicle intends to make the first vehicle change lane from the first traveling lane to the second traveling lane.

At least one portion of the feature in the above described embodiment and the modified example may be eliminated or modified accordingly. At least one feature in the above described embodiment and the modified example may be combined with another one feature in the above described embodiment and the modified example.

This application is based upon and claims the benefit of priority of the prior Japanese Patent Application No. 2017-233733, filed on Dec. 5, 2017, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1 vehicle
11B rear camera
11BL rear left camera
11BR rear right camera
12 rear vehicle sensor
13 ECU
131 image collecting unit
132 synthesizing plane setting unit
133 image synthesizing unit
14 display
111B, 112B rear image
111BL, 112BL rear left image
111BR, 112BR rear right image
111C synthesized image
2 rear vehicle
CS synthesizing plane
IRB, IRBL, IRBR, IRB', IRBL', IRBR' imaging range
SB, SBL, SBR overlapping area
PBL, PBR intersecting part
DSI, DSC blind area

The invention claimed is:

1. An image display apparatus comprising a controller and a display,
   the controller being programmed to:
   set, at a position that is away backward from a first vehicle, a virtual synthesizing plane that intersects with a front to rear axis of the first vehicle; and
   synthesize a rear image and a rear side image to generate a synthesized image in which a scene in the rear image and a scene in the rear side image are seamlessly connected at a position of the synthesizing plane, wherein the rear image is captured by a rear imager that is configured to image a rear area located at the rear of the first vehicle and the rear side image is captured by a rear side imager that is configured to image a rear side area located at the rear and the side of the first vehicle,
   the display being configured to display the synthesized image,
   the controller being programmed to set the synthesizing plane at a position that is closer to the first vehicle than an initial position of the synthesizing plane when a distance between the first vehicle and a second vehicle is shorter than a first threshold value when a detect apparatus detects that the second vehicle exists at the rear of the first vehicle,
   the synthesizing plane being located behind the first vehicle and in front of a travel direction of the second vehicle traveling in a same direction as the first vehicle, and
   the display is configured to display the rear image and the rear side image separately instead of displaying the synthesized image, when a difference between a size of the second vehicle in the rear image and a size of the second vehicle in the rear side image is larger than a predetermined amount.

2. The image display apparatus according to claim 1, wherein
   the controller is programmed to change the position at which the synthesizing plane is set, on the basis of the distance, when the detect apparatus detects that the second vehicle exists at the rear of the first vehicle and when the distance is shorter than a first threshold value.

3. The image display apparatus according to claim 2, wherein
the controller is programmed to set the synthesizing plane at the position that is closer to the first vehicle as the distance is shorter.

4. The image display apparatus according to claim 1, wherein
the controller is programmed to set the synthesizing plane so that the second vehicle is included in the synthesized image seamlessly, when the detect apparatus detects that the second vehicle exists at the rear of the first vehicle and when the distance is shorter than a first threshold value.

5. The image display apparatus according to claim 1, wherein
the rear side imager is configured to image the rear side area located at the rear and one of the right and the left of the first vehicle,
the display is configured to highlight an image part of the synthesized image that corresponds to the rear side image more, when the second vehicle travels on a second traveling lane that is located at one of the right and the left of a first traveling lane on which the first vehicle travels, compared to the case where the second vehicle travels on the first traveling lane.

* * * * *